United States Patent [19]

Lew et al.

[11] Patent Number: 4,802,651
[45] Date of Patent: * Feb. 7, 1989

[54] BALL PLUG VALVE

[76] Inventors: Hyok S. Lew; Yon S. Lew, both of 7890 Oak St., Arvada, Colo. 80005

[*] Notice: The portion of the term of this patent subsequent to Oct. 27, 2004 has been disclaimed.

[21] Appl. No.: 96,150

[22] Filed: Sep. 14, 1987

Related U.S. Application Data

[63] Continuation-in-part of Ser. No. 372,462, Apr. 4, 1982, Pat. No. 4,702,457.

[51] Int. Cl.$^4$ ............................................. G16K 25/00
[52] U.S. Cl. ...................................... 251/161; 251/367
[58] Field of Search ............... 251/367, 159, 170, 172, 251/304, 309, 161

[56] References Cited

U.S. PATENT DOCUMENTS 3,982,727 9/1976 Nelimarkka .................... 251/367 X Primary Examiner—A. Michael Chambers
Assistant Examiner—John C. Fox

[57] ABSTRACT

A shut-off or flow control valve comprises a valve body including a cylindrical cavity with a hemispherical end, which rotatably receives a cylindrical plug with a hemispherical end in a close tolerance, wherein a flow passage with a central axis generally passing through the center of a spherical surface including the hemispherical surface of the plug and intersecting the central axis of the plug in an oblique angle lines up with the flow passage disposed through the valve body when the plug is rotated to the "open" position, while the plug blocks the flow passage through the valve body when it is rotated to the "closed" position.

20 Claims, 2 Drawing Sheets

BALL PLUG VALVE

BACKGROUND OF THE INVENTION

This is a continuation-in-part application to patent application Ser. No. 372,462 entitled "Ball Plug Valve" filed on Apr. 4, 1982 now U.S. Pat. No. 4,702,457.

All of the valves being used in today's industry are based on concepts and designs which are at least half a century old. Although the performance and life-spans of those valves have been improved drastically due to the use of various synthetic and composite materials, none of the valve users are satisfied with the existing technology. It appears that the use of the new materials on old valve designs has reached the limit in improving the valve's performance and its life. A new generation valve must have a revolutionarily new design geared to solve specific problems inherent to the existing valves. A truly new species of valves known as the "Ball Plug Valve" has been invented by Hyok S. Lew and Yon S. Lew as disclosed in the parent patent application of this application, which introduces a valve of a fifth kind to the industry in addition to the existing four different kinds; butterfly valves, gate valves, ball valves and plug valves.

BRIEF SUMMARY OF THE INVENTION

The primary object of the present invention is to provide certain design features to the ball plug valve which facilitate manufacturing process and realize improved performance. The fundamental structure of the ball plug valve comprises a valve body including a cylindrical cavity with a hemispherical end that rotatably receives a cylindrical plug with a hemispherical end (ball plug) in a close tolerance. The ball plug has a through-hole with central axis passing through the center of a spherical surface including the hemispherical end and intersecting the central axis of the ball plug in a forty five degree angle. The valve body includes a flow passage comprising at least two holes extending from the hemispherical end of the cylindrical cavity wherein at least one hole has an opening to the cylindrical cavity surrounded by the spherical surface of the hemispherical end thereof. When the ball plug is rotated to the "open" position, the hole through the ball plug lines up with the flow passage through the valve body. When the ball plug is rotated to the "closed" position, it blocks the flow passage in a leak-proof fashion.

Another object is to provide a ball plug valve having a twopiece valve body wherein the two pieces separate along a plane generally dividing the hemispherical portion and cylindrical portion of the cavity in the valve body.

A further object is to provide a ball plug valve including means for adjusting the seating pressure between the ball plug and the valve seat included in the hemispherical end of the cylindrical cavity.

Yet another object is to provide a ball plug valve including means for relieving the seating pressure prior to opening the valve and imposing the seating pressure after closing the valve.

Yet a further object is to provide a ball plug valve including a positive barrier seal that positively isolates the wetted space from the ambient surrounding.

Still another object is to provide a ball plug valve ideal for high pressure applications.

Still a further object is to provide a ball plug valve ideal for high temperature applications.

These and other applications of the present invention will become clear as the description thereof proceeds.

BRIEF DESCRIPTION OF THE FIGURES

The present invention may be described with a greater clarity and specificity by referring to the following figures.

DESCRIPTION OF THE ILLUSTRATED EMBODIMENTS

Figure 1:
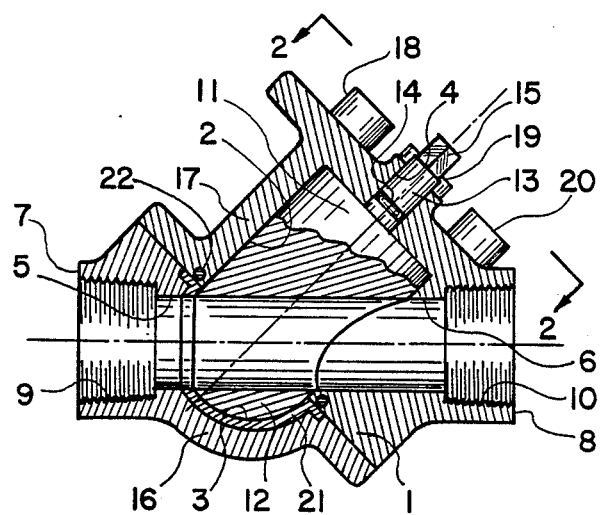
FIG. 1 illustrates a cross section of an embodiment of the ball plug valve.

In FIG. 1 there is illustrated a cross section of an embodiment of the ball plug vlave constructed in accordance with the principles of the present invention. The valve body 1 has a cylindrical cavity 2 with a generally hemispherical end 3, which cylindrical cavity 2 has a circular hole 4 extending through the other end thereof in a coaxial relationship with respect to the central axis of the cylindrical cavity. The valve body further includes at least two flow passages 5 and 6 respectively extending from the cylindrical cavity 2 to the two extremities 7 and 8 of the valve body. The central axes of the two flow passages 5 and 6 generally pass through the center of a spherical surface including the hemispherical surface of the cylindrical cavity 2 and intersect the central axis of the cylindrical cavity 2 in an oblique angle generally equal to forty five degrees. The extremities of the two flow passages 5 and 6 respectively include means such as the pipe threads 9 and 10 for connecting to pipe sections. The cylindrical cavity 2 receives a cylindrical plug (ball plug) 11 with a hemispherical end 12 in a close tolerance. The stem 13 coaxially extending from the other end of the ball plug 11 engages and extends through the hole 4 in a leak proof manner as facilitated by a resilient ring seal 14. The extremity of the stem 13 emerging from the hole 4 includes means such as a noncircular section 15 for coupling to a handle or actuator that rotates the ball plug. It facilitates the manufacturing process to incorporate a two-piece valve body, which includes a first piece 16 including the hemispherical half 3 of the cylindrical cavity 2 and the first fluid passage 5, and a second piece 17 including the cylindrical half of the cylindrical cavity 2 and the second flow passage 6. The two pieces 16 and 17 constituting the valve body 1 separated along a plane that divides the hemispherical and cylindrical halves of the cavity 2 are tied together by a plurality of bolts 18, 19, 20, etc. disposed parallel to and around the cylindrical cavity 2, which extend through the piece 17 end threadedly engage the piece 16. The hemispherical half 3 of the cylindrical cavity 2 may include a hemispherical shell liner 21 fitted in the piece 16 and held in position by the joining pressure between the two pieces 16 and 17. The joint between the two pieces 16 and 17 of the valve body 1 includes a seal such as a ring seal 22 or other gasket sea. It should be understood that the design of the in-line ball plug valve shown in FIG. 1 can be easily modified to an angle ball plug valve by relocating the flow passage 5 to a new orientation 90 degrees thereto and 45 degrees to the central axis of the cylindrical cavity 2, or it may be modified to a three-way ball plug valve by adding a third flow passage as mentioned in the modification thereof to the angle ball plug valve. It should be mentioned that the cylindrical half of the cavity 2 may be lined with a cylindrical shell liner. The flow passages extending from the cylindrical cavity 2, which must be shut off, have to have their openings open to the cylindrical cavity 2 fully surrounded by the hemispherical surface of the cylindrical cavity.

Figure 2:
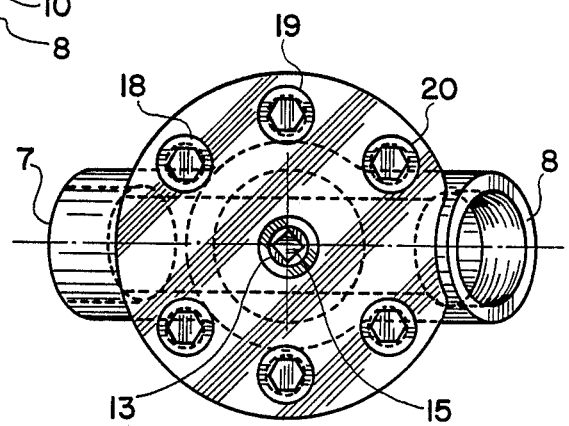
FIG. 2 illustrates another cross section of the ball plug valve shown in FIG. 1.

In FIG. 2 there is illustrated another cross section of the ball plug valve shown in FIG. 1, which cross section is taken along plane 2—2 as shown in FIG. 1. In this cross section, the plurality of bolts 18, 19, 20, etc. joining the two sections 16 and 17 of the valve body are clearly shown, which bolts are distributed axisymmetrically about the cavity 2 in such a way that they do not penetrate into the flow passages.

Figure 3:
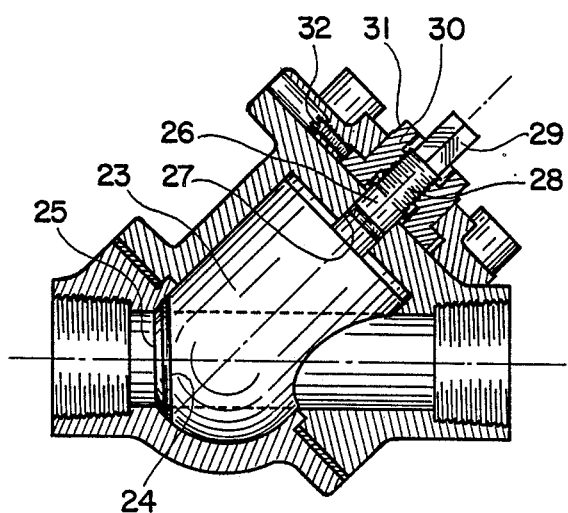
FIG. 3 illustrates a cross section of another embodiment of the ball plug valve including means for adjusting the seating pressure of the ball plug.

In FIG. 3 there is illustrated a cross section of another embodiment of the ball plug valve having essentially the same construction as that illustrated in FIGS. 1 and 2 with a few exceptions. The ball plug 23 includes a ring seal 24 retained in an annular seal groove that is included in the hemispherical portion of the ball plug in a coaxial arrangement about the through-hole 25. The stem 26 extending from the ball plug 23 and through the circular hole 27 in the cavity wall includes a threaded section 28 intermediate the round section and the noncircular section 29, which threaded section threadedly engages a jack screw nut 30 secured to the valve body in a rotatable and nonshifting arrangement. The jack screw nut 30 has wrench flat 31 for turning and a locking set screw 32 for locking in position. The jack screw nut 30 can be used in two different ways: Firstly, the jack screw nut 30 is turned to and locked at a position that exerts the desired amount of seating pressure between the hemispherical surfaces of the ball plug and the cavity. When the ball plug is rotated to the "open" position, the seating pressure is automatically relieved by the thread action, while the seating pressure is automatically established when the ball plug is rotated back to the "closed" position. Secondly, the jack screw nut 30 may be loosened prior to opening the valve and tightened after closing the valve every time the valve is being opened or closed. In such a mode of usage of the jack screw nut 30, it should be provided with a handle in addition to the handle coupled to the noncircular section 29 of the stem.

Figure 4:
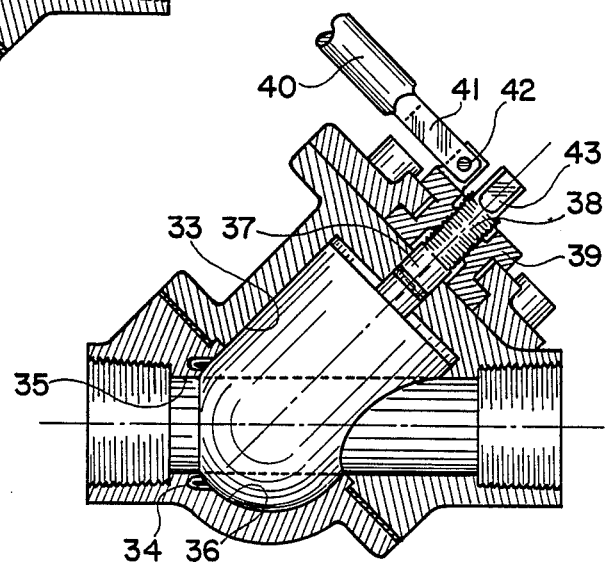
FIG. 4 illustrates a cross section of a further embodiment of the ball plug valve including means for adjusting the seating pressure of the ball plug.

In FIG. 4 there is illustrated a cross section of a further embodiment of the ball plug valve of the present invention having essentially the same construction as that illustrated in FIGS. 1 and 2 with a few exceptions. The cylindrical cavity 33 includes a ring seal 34 retained in an annular groove that is included in the hemispherical surface of the cylindrical cavity 33 in a coaxial arrangement about the flow passage 35 which has the opening open to the cylindrical cavity 33 surrounded by the hemispherical surface 36 thereof. The stem 37 includes a jack screw 38 threadedly engaging a jack screw nut 39 rotatably and nonshiftably secured to the valve body. The jack screw nut 39 includes a handle 40 with one forked extremity 41 secured to the jack screw nut 39 in a pivotable arrangement about an axis 42 off set from and perpendicular to the central axis of the combination of the ball plug and stem. The handle 40 at the position shown in FIG. 4 enables one to tighten or loosen the jack screw nut 39 without rotating the ball plug and, consequently, it enables one to relieve the seating pressure of the ball plug on the ring seal 34 prior to opening the valve and establish the seating pressure after closing the valve. When the handle 40 is pivoted 180 degrees about the axis 42 from the position shown, the slot in the forked end 41 engages the square section 43 of the stem 37 and, consequently, it enables one to rotate the ball plug to the "open" or "closed" position. The jack screw arrangement included in the ball plug valve shown in FIG. 4 may be used in either of the two modes described in conjunction with the corresponding element shown in FIG. 3. The jack screw means illustrated in FIG. 3 or 4 may be incorporated into any one of the three different embodiments of the ball plug valve shown in FIGS. 1, 3 and 4. The ball plug valve used as a flow control valve may include more than one flow passage holes disposed through the ball plug, wherein all or a portion of those flow passage holes connect the two flow passage holes extending from the cylindrical cavity to the two extremities of the valve body depending on the angular position of the ball plug.

Figure 5:
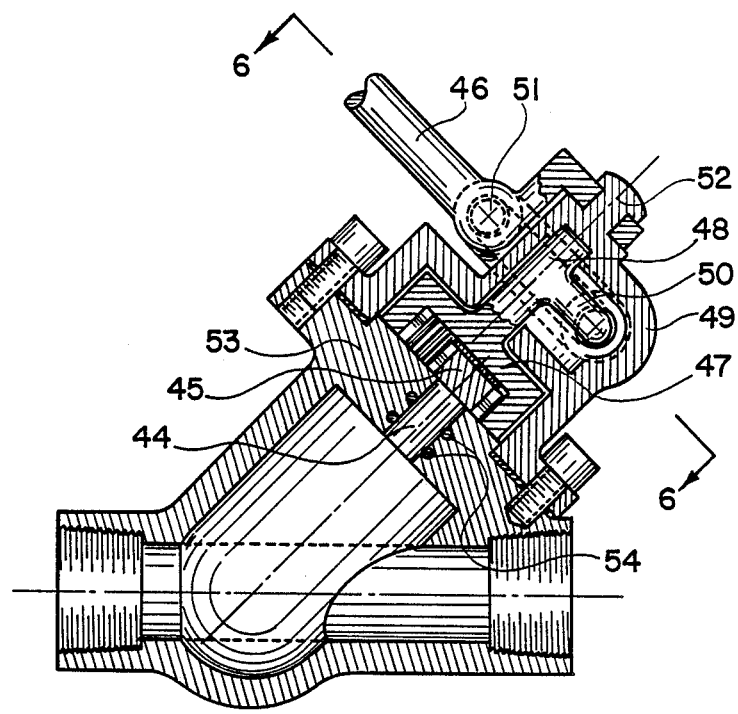
FIG. 5 illustrates a cross section of a positive barrier seal employed in coupling the ball plug and the means for rotating the ball plug.

In FIG. 5 there is illustrated a cross section of a positive barrier seal employed in coupling the stem 44 extending from the ball plug and the handle 46 that rotates the ball plug to the "open" or "closed" position. The extremity of the stem 44 includes a pinion gear 45 engaging an internal ring gear 47 of a larger pitch diameter. The shaft 48 rigidly extending from the internal ring gear 47 in a coaxial arrangement and rotatably secured to the housing 49 has an arm 50 radially extending therefrom. The extremety of the arm 50 includes a curved extension concentric to the shaft 48, which extends through a hole included in the wall of the housing 49. Th extremity of the curved extension is rigidly secured to one extremety 51 of the handle 46, which is rotatably secured to the housing 49 about the axis 52. The curved extension is enclosed in a bellow with two extremities respectively secured to the housing 49 and to a flange included in the extremity 51 of the handle 46 in a leak-proof manner. The housing 49 is secured to the valve body 53 in a leak-proof manner. Therefore, the interior space of the housing 49 is sealed off positively from the ambient space by the wall of the housing 49 and the bellow. As a consequence, the wetted space within the valve body can at most expand only to the interior space of the housing 49 even when the seal 53 springs a leak.

Figure 6:
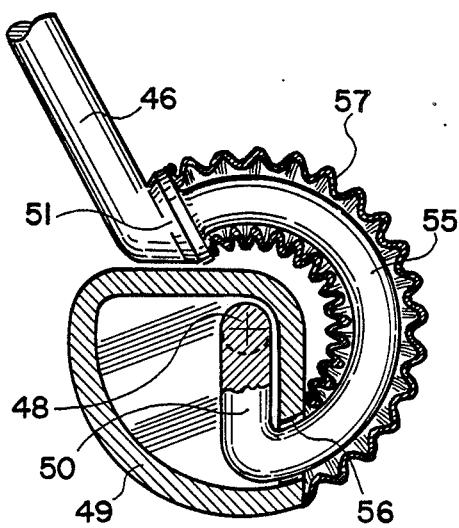
FIG. 6 illustrates another cross section of the positive barrier seal shown in FIG. 5.

In FIG. 6 there is illustrated another cross section of the positive barrier seal shown in FIG. 5, which cross section is taken along plane 6—6 as shown in FIG. 5. The curved extension 55 of the arm 50 extending through the hole 56 included in the wall of the housing 49 is enclosed within a bellow 57 which is secured in a leak-proof manner to the wall of the housing at one extremity and to the flange included in the inner extremity 51 of the handle 46 at the other extremity. The gear coupling between the stem 44 and the shaft 48 is employed as the ball plug has to be rotated by 180 degrees between the "open" and "closed" positions, while the maximum angle of rotation of the handle with a positive barrier seal is generally limited to an angle less than 180 degrees. The jack screw means included in the embodiments shown in FIGS. 3 and 4 can be readily incorporated into the embodiment shown in FIGS. 5 and 6, as the pinion gear 45 can be easily mounted on the noncircular section of the stem shown in FIGS. 3 and 4.

Figure 7:
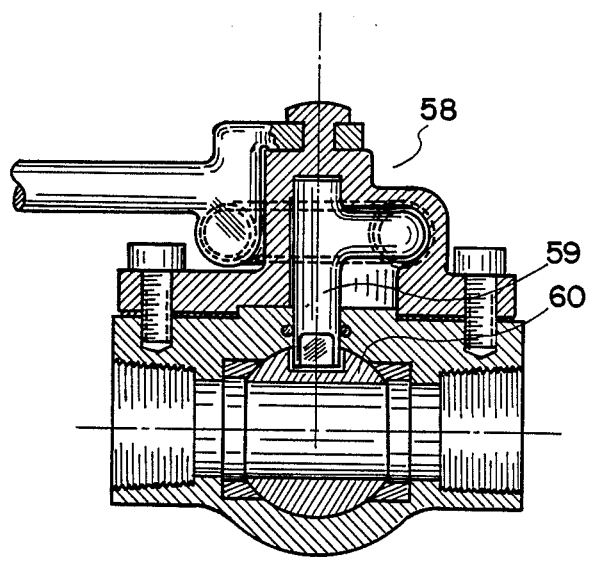
FIG. 7 illustrates another embodiment of the positive barrier seal employed in the construction of a ball valve.

In FIG. 7 there is illustrated a cross section of a ball valve employing a positive barrier seal. The ball valve and other quarter turn valves such as the butterfly valve and plug valve require only 90 degree rotation of the blocking body included therein. The positive barrier seal assembly 58 having essentially the same construction as the corresponding element shown in FIG. 6 readily provides 90 degree rotation of the shaft 59 and, consequently, the shaft 59 is employed as the valve stem directly coupled to the ball 60 without using any gear coupling. The positive barrier seal of the present invention may be employed in the construction of a butterfly valve or plug valve in the same way as the construction of the ball valve shown in FIG. 7. The positive barrier seal in combination with the adjutable seating pressure idea employed in the ball plug valve of the present invention provides a leak-proof valve for critical applications wherein any leak is positively not allowed.

While the principles of the present invention have now been made clear by the illustrative embodiments, there will be immediately obvious to those skilled in the art many modifications of the structures, arrangements, proportions, elements and materials which are particularly adapted to the specific working environments and operating conditions in the practice of the invention without departing from those principles.

We claim:

1. An apparatus for shutting off and/or controlling fluid flows comprising in combination:
    (a) a valve body including a cylindrical cavity with a generally hemispherical end, and two flow passages respectively extending from said cylindrical cavity to two extremities of the valve body wherein at least one of the two flow passages has an opening emerging through the hemispherical surface of the hemispherical end of said cylindrical cavity;
    (b) a cylindrical plug with a generally hemispherical end engaging said cylindrical cavity in a close tolerance at least on cylindrical and hemispherical surfaces thereof, said cylindrical plug including at least one flow passage hole disposed therethrough in an oblique angle with respect to the central axis of the cylindrical plug, wherein one opening of the flow passage hole emerges through the hemispherical surface of the hemispherical end of said cylindrical plug;
    (c) means for rotating said cylindrical plug; and
    (d) means for adjusting seating pressure between the two hemispherical surfaces respectively included in said cylindrical cavity and said cylindrical plug;
wherein the flow passage hole disposed through the cylindrical plug connects the two flow passages included in the valve body when the cylindrical plug is rotated to a first position, and the cylindrical plug blocks off connection between the two flow passages included in the valve body when the cylindrical plug is rotated to a second position.

2. The combination as set forth in claim 1 wherein said combination includes a ring seal retained in an annular groove included in the hemispherical surface of said cylindrical cavity about said opening of a flow passage emerging through the hemispherical surface of said cylindrical cavity.

3. The combination as set forth in claim 1 wherein said combination includes a ring seal retained in an annular groove included in the hemispherical surface of said cylindrical plug about said opening of the flow passage hole emerging through the hemispherical surface of said cylindrical plug.

4. The combination as set forth in claim 1 wherein the hemispherical surface of said cylindrical cavity includes a generally hemispherical shell liner.

5. The combination as set forth in claim 1 wherein said valve body comprises two pieces separatable along a plane generally dividing the cylindrical cavity into the hemispherical portion and the cylindrical portion, wherein the two pieces are joined together by mechanical fastening means.

6. The combination as set forth in claim 1 wherein said cylindrical plug includes a stem coaxially extending from one extremity of the cylindrical plug opposite to said generally hemispherical end and extending through one end wall of the cylindrical cavity, wherein said stem is coupled to said means for rotating said cylindrical plug.

7. The combination as set forth in claim 6 wherein said means for adjusting seating pressure comprises a jack screw means included in said stem.

8. The combination as set forth in claim 7 wherein said combination includes means for locking and unlocking said jack screw means.

9. The combination as set forth in claim 7 wherein said combination includes a handle pivotably secured to the jack screw means wherein the handle turns the jack screw means only when the handle is positioned at a first pivot position and the handle rotates the stem as well as the jack screw means when the handle is positioned at a second pivot position.

10. The combination as set forth in claim 6 wherein said means for rotating the cylindrical plug comprises a rotating member with radially extending member coupled to said stem; a housing enclosing said rotating member in a leak-proof manner; a curved elongated member with a radius of curvature originating from the central axis of the rotating member, said curved elongated member connected to said radially extending member at one extremity and extending through an opening disposed through the wall of the housing; means for turning the rotating member connected to the other extremity of the curved elongated member; and an axially flexible tubular member enclosing the curved elongated member, said tubular member connected in a leak-proof manner to the housing at one extremity and to the means for turning at the other extremity.

11. An apparatus for shutting off and/or controlling fluid flows comprising in combination:
    (a) a valve body including a cylindrical cavity with a generally hemispherical end, and two flow passages respectively extending from said cylindrical cavity to two extremities of the valve body wherein at least one of the two flow passages has an opening emerging through the hemispherical surface of the hemispherical end of said cylindrical cavity;
    (b) a cylindrical plug with a generally hemispherical end engaging said cylindrical cavity in a close tolerance at least on cylindrical and hemispherical surfaces thereof, said cylindrical plug including at least one flow passage hole disposed therethrough in an oblique angle with respect to the central axis of the cylindrical plug, wherein one opening of the flow passage hole emerges through the hemispherical surface of the hemispherical end of said cylindrical plug; and (c) means for rotating said cylindrical plug; wherein the flow passage hole disposed through the cylindrical plug connects the two flow passages included in the valve body when the cylindrical plug is rotated to a first position, and the cylindrical plug blocks off connection between the two flow passages included in the valve body when the cylindrical plug is rotated to a second position.

12. The combination as set forth in claim 11 wherein said combination inlcudes a ring seal retained in an annular groove included in the hemispherical surface of said cylindrical cavity about said opening of a flow passage emerging through the hemispherical surface of said cylindrical cavity.

13. The combination as set forth in claim 11 wherein said combination includes a ring seal retained in an annular groove included in the hemispherical surface of said cylindrical plug about said opening of the flow passage hole emerging through the hemispherical surface of said cylindrical plug.

14. The combination as set forth in claim 11 wherein the hemispherical surface of said cylindrical cavity includes a generally hemispherical shell liner.

15. The combination as set forth in claim 11 wherein said valve body comprises two pieces separatable along a plane generally dividing the cylindrical cavity into the hemispherical portion and the cylindrical portion, wherein the two pieces are joined together by mechanical fastening means.

16. The combination as set forth in claim 11 wherein said cylindrical plug includes a stem coaxially extending from one extremity of the cylindrical plug opposite to said generally hemispherical end and extending through one end wall of the cylindrical cavity, wherein said stem is coupled to said means for rotating said cylindrical plug.

17. The combination as set forth in claim 16 wherein said means for adjusting seating pressure comprises a jack screw means included in said stem.

18. The combination as set forth in claim 17 wherein said combination includes means for locking and unlocking said jack screw means.

19. The combination as set forth in claim 17 wherein said combination includes a handle pivotably secured to the jack screw means wherein the handle turns the jack screw means only when the handle is positioned at a first pivot position and the handle rotates the stem as well as the jack screw means when the handle is positioned at a second pivot position.

20. The combination as set forth in claim 16 wherein said means for rotating the cylindrical plug comprises a rotating member with radially extending member coupled to said stem; a housing enclosing said rotating member in a leak-proof manner; a curved elongated member with a radius of curvature originating from the central axis of the rotating member, said curved elongated member connected to said radially extending member at one extremity and extending through an opening disposed through the wall of the housing; means for turning the rotating member connected to the other extremity of the curved elongated member; and an axially flexible tubular member enclosing the curved elongated member, said tubular member connected in a leak-proof manner to the housing at one extremity and to the means for turning at the other extremity.

* * * * *